(12) United States Patent
Yang et al.

(10) Patent No.: US 9,160,036 B2
(45) Date of Patent: Oct. 13, 2015

(54) ELECTROLYTE ADDITIVES FOR LITHIUM SULFUR RECHARGEABLE BATTERIES

(71) Applicant: GM Global Technology Operations LLC, Detroit, MI (US)

(72) Inventors: Li Yang, Troy, MI (US); Mei Cai, Bloomfield Hills, MI (US); Minghong Liu, Changle (CN)

(73) Assignee: GM Global Technology Operations LLC, Detroit, MI (US)

(*) Notice: Subject to any disclaimer, the term of this patent is extended or adjusted under 35 U.S.C. 154(b) by 315 days.

(21) Appl. No.: 13/836,129

(22) Filed: Mar. 15, 2013

(65) Prior Publication Data

US 2014/0272603 A1    Sep. 18, 2014

(51) Int. Cl.
*H01M 10/40* (2006.01)
*H01M 10/0569* (2010.01)
*H01M 10/052* (2010.01)
*H01M 10/0567* (2010.01)
H01M 10/0568 (2010.01)

(52) U.S. Cl.
CPC ........ *H01M 10/0569* (2013.01); *H01M 10/052* (2013.01); *H01M 10/0567* (2013.01); *H01M 10/0568* (2013.01); *Y02E 60/122* (2013.01)

(58) Field of Classification Search
CPC ............ H01M 10/05; H01M 10/0567; H01M 10/0569; H01M 10/052; H01M 10/0568

USPC .......... 429/221, 49, 405, 303, 329, 341, 337, 429/326, 188, 199

See application file for complete search history.

(56) References Cited

U.S. PATENT DOCUMENTS

| | | | |
|---|---|---|---|
| 6,358,643 B1 | 3/2002 | Katz et al. | |
| 6,852,450 B2 | 2/2005 | Hwang et al. | |
| 7,241,535 B2 | 7/2007 | Kim et al. | |
| 7,517,612 B2 | 4/2009 | Ryu et al. | |
| 7,842,421 B2 | 11/2010 | Mikhaylik | |
| 8,252,461 B2 | 8/2012 | Vu et al. | |
| 2010/0119950 A1* | 5/2010 | Hwang et al. | 429/303 |
| 2012/0052339 A1* | 3/2012 | Mikhaylik et al. | 429/50 |
| 2012/0214043 A1 | 8/2012 | Olschimke et al. | |

* cited by examiner

*Primary Examiner* — Kenneth Douyette
(74) *Attorney, Agent, or Firm* — Harness, Dickey & Pierce, P.L.C.

(57) ABSTRACT

An electrolyte solution for a lithium sulfur battery contains a lithium oxalatoborate compound in a 0.05-2 M solution in conventional lithium sulfur battery electrolyte solvents, optionally with other lithium compounds. Examples of solvents include dimethoxyethane (DME), dioxolane, and triethyleneglycol dimethyl ether (TEGDME). Electrochemical cells contain a lithium anode, a sulfur-containing cathode, and a non-aqueous electrolyte containing the lithium oxalatoborate compound. Lithium sulfur batteries contain a casing enclosing a plurality of the cells.

19 Claims, 3 Drawing Sheets

US 9,160,036 B2

ELECTROLYTE ADDITIVES FOR LITHIUM SULFUR RECHARGEABLE BATTERIES

INTRODUCTION

Rechargeable lithium sulfur batteries are a promising energy storage system. The theoretical specific capacity, 1675 mAh/g, of sulfur is ten times of that of commercial cathode material, such as $LiCoO_2$ or $LiMn_2O_4$. Sulfur is inexpensive and non-toxic and has potential for powering electric vehicles (EVs) and hybrid electric vehicles (HEVs).

When lithium sulfur batteries are discharged, elemental sulfur ($S_8$) is reduced so as to generate sulfide and polysulfide. Some of these, and their lithium salts, are soluble in solvents such as the ether-based solvents (dioxolane, DME and TEGDME) commonly used in the batteries. Soluble species migrate to the anode, and react with lithium directly to form lower state $S_4^{2-}$, $S_2^{2-}$ and $S^{2-}$. These soluble lower state polysulfide anions can also migrate back to cathode where they can be oxidized to higher state polysulfide anions. This is the basis of a so-called redox shuttle phenomenon. It leads to poorer battery performance and is reflected in a relatively longer charging voltage plateau.

Also, the lower state $S_2^{2-}$ and $S^{2-}$ may precipitate out as $Li_2S_2$ and $Li_2S$ on the surface of the anode, which results in the loss of active material and decrease of the cycle life.

Scientists over the world are doing extensive studies to develop a Li—S system with higher coulombic efficiency and less redox-shuttle phenomenon. Efforts include coating the separator with ceramic filler ($V_2O_5$), fabricating mesoporous carbon-sulfide composite cathode (which limits the polysulfide migration) and modifying electrolyte by use of electrolyte additives. All these modifications of the separator, cathode, and electrolyte mitigate the redox-shuttle phenomenon to some extent. For example, an additive like $LiNO_3$ can be added into the electrolyte to generate a thick layer solid electrolyte interphase (SEI) on the lithium metal surface of the anode. This has the beneficial effect of blocking the direct reaction of polysulfide anions with the lithium metal. However, the Li—S cell with $LiNO_3$ additive usually has higher resistance, which decreases the power of the Li—S battery, especially at higher discharge rates. Furthermore, $LiNO_3$ is a potential explosive, which can release radical oxygen atoms at extreme conditions.

SUMMARY

A new class of electrolyte additives is disclosed for use in lithium sulfur batteries. The additives, based on lithium oxalate borate compounds, can be preferentially reduced at the anode (Li or Si) or oxidized at the cathode (S) so as to mitigate the redox-shuttle phenomenon. The oxalate ligand and boron atom form a five-membered ring that has 11 kCal/mol higher ring strain than an open structure, allowing the compound to undergo ring opening at the anode or cathode and form a layer of solid electrolyte interphase.

An electrolyte solution for a lithium sulfur battery contains a lithium oxalate borate compound in a 0.05-2 M solution in conventional lithium sulfur battery electrolyte solvents, optionally with other lithium compounds. Examples of solvents include dimethoxyethane (DME), dioxolane, and triethyleneglycol dimethyl ether (TEGDME). Electrochemical cells contain an anode containing lithium, a cathode containing an electroactive sulfur-containing material, and a non-aqueous electrolyte containing the lithium oxalate borate compound. Lithium sulfur batteries contain a casing enclosing a plurality of the cells.

DRAWINGS

The drawings described herein are for illustrative purposes only of selected embodiments and not all possible implementations, and are not intended to limit the scope of the present disclosure.

DESCRIPTION

Figure 1A:
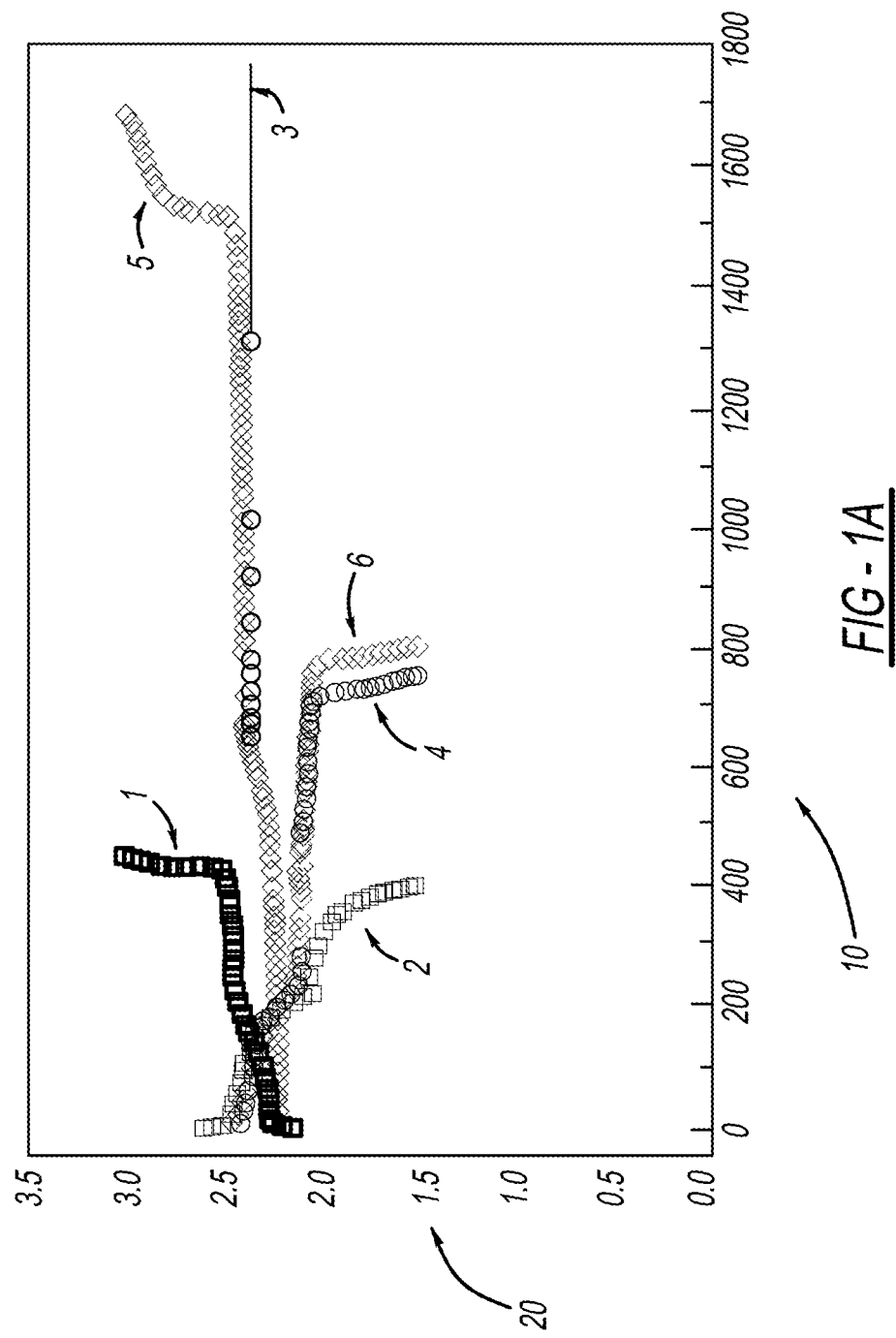
FIG. 1A shows voltage 20 and specific capacity 10 (mAh/g) for the first charge-discharge cycle of a lithium-sulfur battery.

In one embodiment an electrolyte solution for a lithium sulfur battery contains 0.05 to 4 M or 0.05 to 2 M lithium oxalatoborate related compounds in a solvent suitable for use in the battery. In various embodiments, the solvent comprises organic ethers. In various embodiments, the concentration of lithium oxalatoborate related compound is 0.1 to 2 M, 0.1 to 1 M, 0.1 to 0.5 M or about 0.3 M.

In various embodiments, solvents in the electrolyte solution are selected from, or consist of, one or more of DME, DIOX, and TEGDME, as these are defined below. In further embodiments, the electrolyte solution contains other lithium compounds or salts at a concentration of 0.1 to 4 M. Representative is LiTFSI, as discussed below. In these embodiments and others described herein, non-limiting examples of lithium oxalatoborate related compounds include LiBOB, LiODFB, and LiMOB.

In another embodiment, an electrochemical cell contains a positive electrode containing an electroactive sulfur containing material, a negative electrode containing lithium, and a non-aqueous electrolyte. The non-aqueous electrolyte is an electrolyte solution as described further herein. A lithium battery contains a casing and a plurality of electrochemical cells as described herein.

Further non-limiting description of various aspects of the disclosures is given below and in the working examples. Where each embodiment consists of a variety of parameters, it is intended that description of each of the parameters can be used in all of the embodiments, unless context requires otherwise. New electrolyte solutions contain lithium oxalatoborate related compounds. Those solutions can be used as an electrolyte in electrochemical cells of lithium sulfur batteries, and the electrochemical cells can be combined to provide lithium sulfur batteries.

In conventional fashion, the positive electrode is the cathode on discharge where net reduction of sulfur occurs. The negative electrode is the anode on discharge, where the net reaction is the oxidation of Li to Li+. When the cell is being charged, the roles are reversed and the positive electrode is the anode and the negative electrode is the cathode.

In various embodiments, a lithium-sulfur battery includes a casing housing a plurality of electrochemical cells. The cells contain a positive electrode, a negative electrode, and a separator interposed between the positive electrode and the negative electrode. An electrolyte is disposed between the positive and negative electrodes and includes an additive selected from lithium oxalate borates.

The positive electrode includes sulfur-based compounds for a positive active material, which include at least one selected from elemental sulfur, $Li_2S_n$ (wherein n is 1 or greater), $Li_2S_n$ (wherein n is 1 or greater) dissolved in a catholyte, an organosulfur compound, and a carbon-sulfur polymer $((C_2S_x)_n$: wherein x=2.5-50, and n is 2 or greater). In various embodiments, the positive electrode further includes electrically conductive materials that facilitate the movement of the electrons within the positive electrode. Examples of the conductive materials include a conductive material such as graphite or carbon-based materials, or a conductive polymer. The carbon-based material includes ketchen black, denka black, acetylene black, carbon black, and so on. Examples of the conductive polymer include polyaniline, polythiophene, polyacetylene, polypyrrole, and the like. The conductive material can be used singularly or as a mixture of two or more.

According to yet another embodiment, a binder is added to enhance the adherence of the positive active material to its current collector. Examples of the binder include poly(vinyl acetate), poly vinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoropropylene and polyvinylidene fluoride (marketed under the name of KYNAR), poly(ethyl acrylate), polytetrafluoroethylene, polyvinyl chloride, polyacrylonitrile, polyvinylpyridine, polystyrene, and derivatives, blends, and copolymers thereof.

The negative electrode includes a negative active material selected from a material in which the lithium intercalation reversibly occurs, materials in which a lithium-containing compound is reversibly generated by reacting with lithium ions, lithium alloys, and lithium metals. The materials in which lithium intercalation reversibly occurs are carbon-based compounds. Any carbon material may be used as long as it is capable of intercalating and de-intercalating lithium ions. Examples of the carbon material include crystalline carbon, amorphous carbon, and a mixture thereof. Examples of materials in which a lithium-containing compound is reversibly generated by reacting with lithium ions include tin dioxide ($SnO_2$), titanium nitrate, silicon, and the like. Examples of the metals capable of forming the lithium alloys include Na, K, Rb, Cs, Fr, Be, Mg, Ca, Sr, Ba, Ra, Al, and Sn.

The non-aqueous electrolyte includes organic solvent families such as acetals, ketals, sulfones, acyclic ethers, cyclic ethers, glymes, polyethers, and dioxolanes, and blends thereof.

Examples of acyclic ethers include dibutyl ether, dimethoxymethane, trimethoxymethane, dimethoxyethane (DME), diethoxyethane, 1,2-dimethoxypropane, and 1,3-dimethoxypropane.

Examples of cyclic ethers that may be used include tetrahydrofuran, tetrahydropyran, 2-methyltetrahydrofuran, 1,4-dioxane, 1,3-dioxolane, and trioxane.

Examples of polyethers that may be used include diethylene glycol dimethyl ether (diglyme), triethylene glycol dimethyl ether (triglyme, TEGDME), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers.

Examples of sulfones include sulfolane, 3-methyl sulfolane, and 3-sulfolene.

In various embodiments, the non-aqueous electrolyte contains a lithium compound or compounds, normally in the form of a lithium salt, in addition to the oxalatoborates discussed herein. The concentration of the lithium salt is in the range between 0 and 4 M, and preferably in the range between 0.05 and 1.5 M. Examples include $LiPF_6$ (lithium hexafluorophosphate), $LiBF_4$ (lithium tetrafluoroborate), $LiSbF_6$, $LiAsF_6$ (lithium hexafluoroarsenate), $LiClO_4$ (lithium perchlorate), $LiCF_3SO_3$ (lithium trifluorosulfonate), (LiN$(C_2F_5SO_2)_2$) (lithium bis(perfluoroethylsulfonyl)imide), and $Li(CF_3SO_2)_2N$ (lithium bis(trifluoro methylsulfonyl) imide or LiTFSI).

The non-aqueous electrolyte further contains as additive a lithium oxalatoborate compound, also referred herein as a lithium oxalatoborate related compound. This is a lithium salt of a borate in which 2 of the ligands on boron are provided by oxalate to form a five membered ring. Particular examples include lithium bisoxalato borate (LiBOB), lithium difluoro oxalate borate (LiODFB), and lithium malonato oxalate borate (LiMOB)

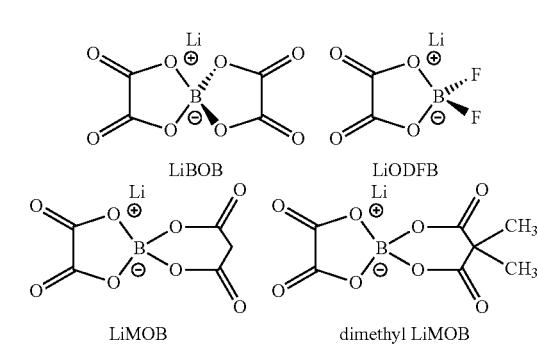

LiBOB        LiODFB

LiMOB        dimethyl LiMOB

These and other lithium oxalate borate compounds are commercially available or can be synthesized using well known synthetic routes.

EXAMPLES

Example 1

LiMOB, which has a five membered ring and a six membered ring (dimethyl substituted 6-membered ring in the case of the dimethyl LiMOB), is effective at mitigating the effects of the polysulfide redox-shuttle reaction. Although the invention is not to be limited by theory, it is felt that the five-membered ring on the LiMOB and other lithium oxalatoborate related compounds can readily decompose on the anode to form a stable solid-electrolyte interface layer (SEI) to block the contact of the polysulfide anions. In the case of LiMOB, the bulky six-membered ring structure, which is not as reactive due to the less strain, offers a further steric hindrance to effectively block the polysulfide anions from coming directly into contact with lithium metal of the electrode. As seen in FIG. 1, addition of 0.3M LiMOB into the electrolyte enables successful cycling a of Li—S battery, even in the most aggressive solvent system of dimethoxyethane (DME) and dioxolane (DIOX).

FIG. 1a shows voltage 20 and specific capacity 10 (mAh/g) for the first charge-discharge cycle of a lithium-sulfur battery. The graph shows charge 1 and discharge 2 curves for a battery with an electrolyte containing TEGDME and LiTFSI; charge 3 and discharge 4 curves for a battery with an electrolyte containing DME/DIOX and LiTFSI; and charge 5 and discharge 6 curves for a battery with an electrolyte containing DME/DIOX/TEGDME and LiTFSI.

Figure 1B:
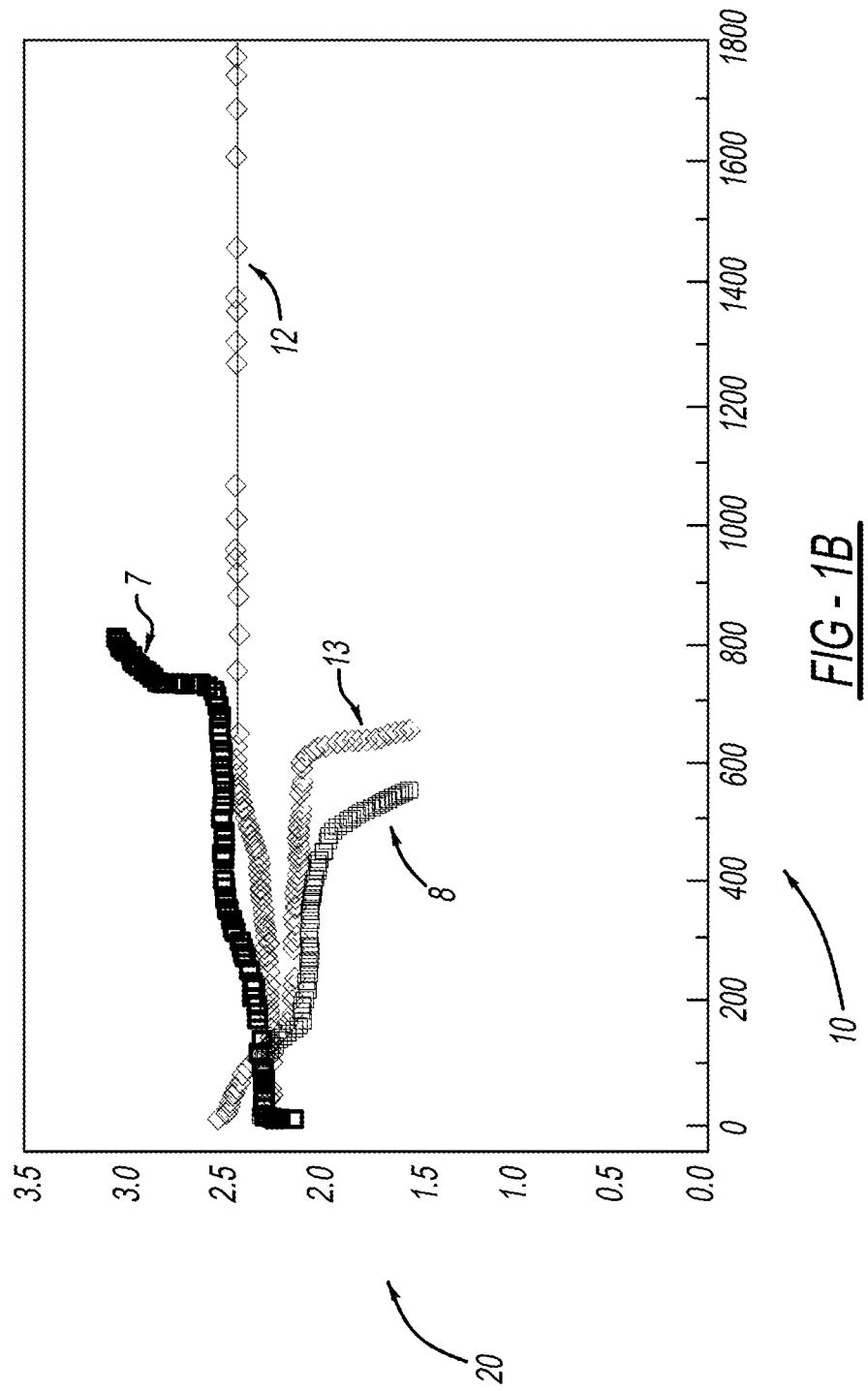
FIG. 1B shows the same for the second cycle.

FIG. 1b shows the same for the second cycle. Curves 7 and 8 represent the second cycle of curves 1 and 2. Curves 12 and 13 and 13 represent the second cycle of curves 5 and 6. The cell with LiTFSI-DME:DIOX electrolyte could not be cycled due to the redox effect, as shown by the long voltage plateau in the charge profile in the first cycle (FIG. 1a).

Figure 1C:
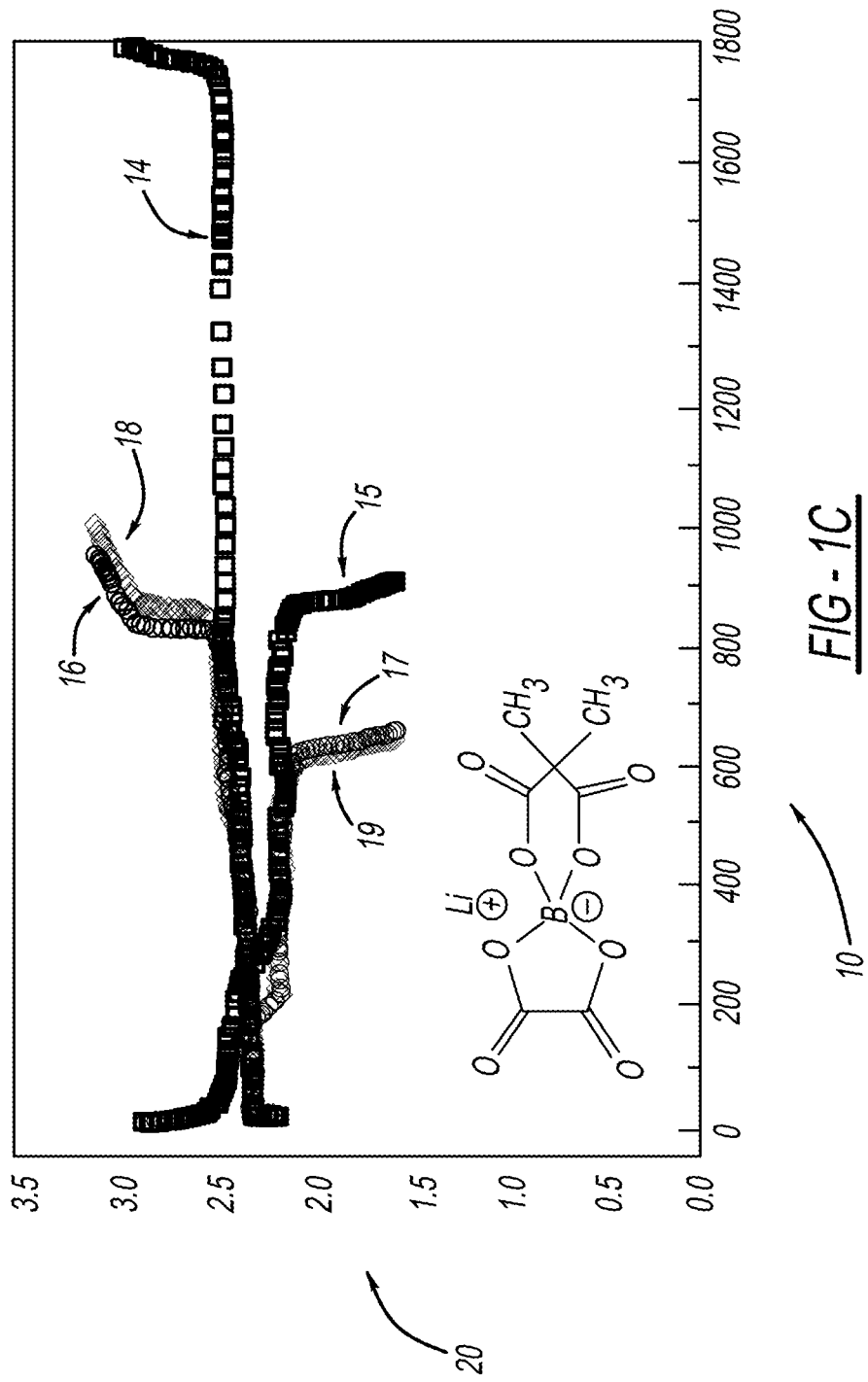
FIG. 1C shows the results for a lithium sulfur battery with an electrolyte.

FIG. 1c gives results for a lithium sulfur battery with an electrolyte containing 0.7 M LiTFSI and 0.3 M LiMOB in a 1:1 (v:v) mixture of DME and DIOX. The first charge and first discharge are curves 14 and 15, respectively. The second charge and second discharge are curves 16 and 17, respectively. The third charge and third discharge are curves 18 and 19, respectively.

What is claimed:

1. An electrolyte solution for a lithium sulfur battery comprising 0.05 to 4 M lithium oxalatoborate compound in a solvent comprising organic ethers, wherein the solution comprises dimethyl lithium malonato oxalato borate.

2. The electrolyte solution according to claim 1 comprising 0.1 to 1 M lithium oxalatoborate.

3. The electrolyte solution according to claim 1 comprising 0.1 to 0.5 M lithium oxalatoborate.

4. The electrolyte solution according to claim 1 comprising 0.3 M lithium oxalatoborate.

5. The electrolyte solution according to claim 1, wherein the solvent comprises dimethoxymethane (DME), dioxolane (DIOX), or triethyleneglycol dimethyl ether (TEGDME).

6. The electrolyte solution according to claim 1, wherein the solvent consists of one or more of DME, DIOX, and TEGDME.

7. The electrolyte solution according to claim 1, further comprising additional lithium salts at a concentration of 0.05 to 4 M.

8. The electrolyte solution according to claim 7, wherein the additional lithium salt comprises lithium bis trifluoro methylsulfonyl imide (LiTFSI).

9. The electrolyte solution according to claim 1, further comprising lithium bisoxalatoborate (LiBOB).

10. The electrolyte solution according to claim 1, further comprising lithium difluoro oxalatoborate (LiODFB).

11. The electrolyte solution according to claim 1, further comprising lithium malonato oxalatoborate (LiMOB).

12. A lithium sulfur battery comprising the electrolyte solution according to claim 1.

13. An electrochemical cell comprising:
   a. a positive electrode comprising an electroactive sulfur containing material;
   b. a negative electrode comprising lithium; and
   c. a non-aqueous electrolyte, wherein the electrolyte comprises dimethyl lithium malonato oxalato borate.

14. The electrochemical cell according to claim 13, wherein the electrolyte further comprises lithium bisoxalatoborate (LiBOB).

15. The electrochemical cell according to claim 13, wherein the electrolyte further comprises lithium difluoro oxalatoborate (LiODFB).

16. The electrochemical cell according to claim 13, wherein the electrolyte further comprises lithium malonato oxalatoborate (LiMOB).

17. The electrochemical cell according to claim 13, wherein the electrolyte comprises a solvent selected from dimethoxymethane (DME), dioxolane (DIOX), and triethyleneglycol dimethyl ether (TEGDME).

18. The electrochemical cell according to claim 17, wherein the solvent consists of one or more of DME, DIOX, and TEGDME.

19. The electrochemical cell according to claim 13, wherein the electrolyte is 0.01 to 4 M in lithium oxalatoborate compound.

* * * * *